(12) United States Patent
Rowe

(10) Patent No.: US 12,743,874 B2
(45) Date of Patent: Sep. 22, 2026

(54) MODEL PRECONDITIONING FOR FACE RECOGNITION

(71) Applicant: HID Global Corp., Austin, TX (US)

(72) Inventor: Robert Kjell Rowe, Poulsbo, WA (US)

(73) Assignee: HID Global Corp., Austin, TX (US)

( * ) Notice: Subject to any disclaimer, the term of this patent is extended or adjusted under 35 U.S.C. 154(b) by 323 days.

(21) Appl. No.: 18/549,976

(22) PCT Filed: Mar. 12, 2021

(86) PCT No.: PCT/US2021/070267
§ 371 (c)(1),
(2) Date: Sep. 11, 2023

(87) PCT Pub. No.: WO2022/191902
PCT Pub. Date: Sep. 15, 2022

(65) Prior Publication Data

US 2024/0153254 A1 May 9, 2024

(51) Int. Cl.
*G06V 10/774* (2022.01)
*G06V 10/26* (2022.01)
*G06V 40/16* (2022.01)

(52) U.S. Cl.
CPC .......... *G06V 10/7753* (2022.01); *G06V 10/26* (2022.01); *G06V 40/172* (2022.01)

(58) Field of Classification Search
CPC .. G06V 10/7753; G06V 10/26; G06V 40/172; G06F 18/214; G06F 18/24133
See application file for complete search history.

(56) References Cited

U.S. PATENT DOCUMENTS

| | | | | |
|---|---|---|---|---|
| 12,288,374 | B1 * | 4/2025 | Averbuch | G06V 10/764 |
| 2005/0213810 | A1 * | 9/2005 | Sabe | G06V 40/165 382/159 |
| 2012/0170852 | A1 * | 7/2012 | Zhang | G06V 40/171 382/197 |
| 2017/0236057 | A1 * | 8/2017 | Lane | G06V 10/82 706/25 |
| 2020/0320346 | A1 * | 10/2020 | Nikolenko | G06N 3/045 |
| 2020/0380060 | A1 * | 12/2020 | Siani Cohen | G06F 16/958 |

(Continued)

FOREIGN PATENT DOCUMENTS

WO 2022191902 9/2022

OTHER PUBLICATIONS

"International Application Serial No. PCT US2021 070267, International Search Report mailed Dec. 8, 2021", 4 pgs.

(Continued)

*Primary Examiner* — Wesley J Tucker
(74) *Attorney, Agent, or Firm* — Schwegman Lundberg & Woessner, P.A.

(57) ABSTRACT

Systems and methods may be used for preconditioning a model, such as for face recognition. The preconditioning may include obtaining a set of facial images, generating, from a plurality of facial images of the set, a plurality of sets of cropped images, each cropped image in the plurality of sets of cropped images including a portion of a face of an image representing a respective set, and preconditioning a machine learning model using the plurality of sets of cropped images. The machine learning model may be refined, such as using a labeled set of captured images of real faces, in an example.

16 Claims, 5 Drawing Sheets

(56) References Cited

U.S. PATENT DOCUMENTS

| | | | | |
|---|---|---|---|---|
| 2021/0209387 | A1* | 7/2021 | Nikitidis | G06V 40/168 |
| 2021/0383241 | A1* | 12/2021 | Karras | G06N 3/084 |
| 2022/0207259 | A1* | 6/2022 | Zhang | G06V 20/40 |
| 2022/0292171 | A1* | 9/2022 | Taher | G06V 40/172 |
| 2023/0094954 | A1* | 3/2023 | Sinha | G06V 10/776 |
| | | | | 382/103 |
| 2023/0186617 | A1* | 6/2023 | Karras | G06N 3/088 |
| | | | | 706/25 |
| 2024/0346735 | A1* | 10/2024 | Song | G06V 40/174 |
| 2024/0378912 | A1* | 11/2024 | Sarkar | G06V 10/82 |
| 2024/0395093 | A1* | 11/2024 | Ming | G06V 40/169 |
| 2025/0104308 | A1* | 3/2025 | Zhou | G06T 11/00 |
| 2025/0181688 | A1* | 6/2025 | Choi | G06F 21/32 |
| 2025/0278917 | A1* | 9/2025 | Luo | G06V 10/25 |

OTHER PUBLICATIONS

"International Application Serial No. PCT US2021 070267, Written Opinion mailed Dec. 8, 2021", 7 pgs.

Kortylewski, Adam, "Training Deep Face Recognition Systems with Synthetic Data", arxiv.org, Cornell University Library, 201 Olin Library Cornell University Ithaca, NY 14853, (Feb. 16, 2018).

"European Application Serial No. 21716944.0, Response Filed Apr. 18, 20 24 to Communication pursuant to Rules 161(1) and 162 EPC mailed Oct. 13, 2023", 12 pgs.

"European Application Serial No. 21716944.0, Invitation pursuant to Article 94(3) and Rule 71(1) EPC mailed Mar. 24, 2026", 4 pgs.

* cited by examiner

MODEL PRECONDITIONING FOR FACE RECOGNITION

PRIORITY APPLICATIONS

This application is a U.S. National Stage filing under 35 U.S.C. § 371 of PCT Patent Application No. PCT/US2021/070267, filed on Mar. 12, 2021, the disclosure of which is incorporated by reference herein in its entirety.

BACKGROUND

State of the art face recognition is based on neural networks with a large number of layers, known as deep networks. These networks typically have many millions of parameters that need to be "learned" during training. In order to train such a network, an iterative procedure is typically performed (e.g., stochastic gradient descent) wherein the network predicts on subsets of labeled training images and the parameters of the network are adjusted by small amounts to provide progressively more accurate answers.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
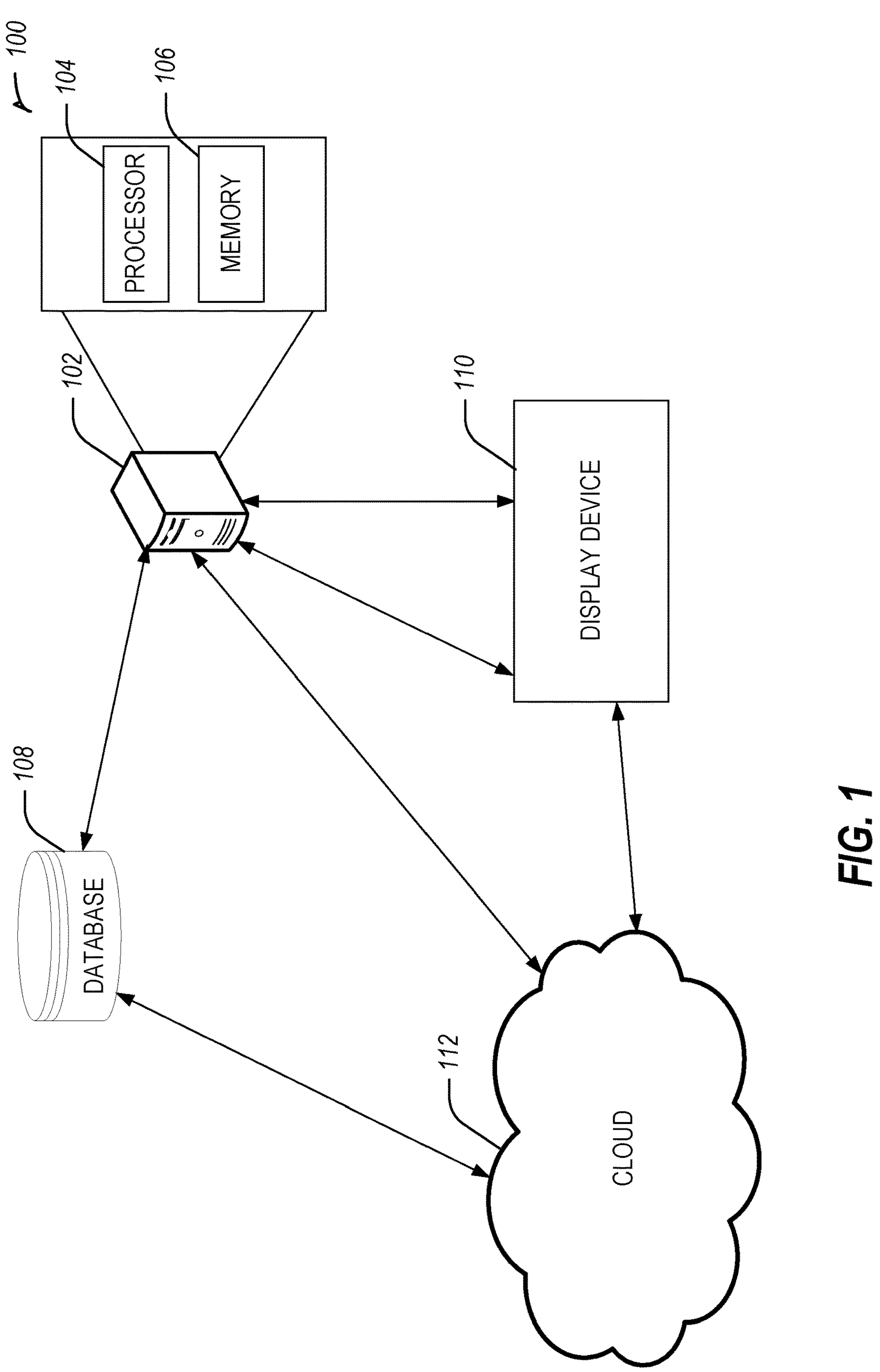
FIG. 1 illustrates a system for preconditioning a model in accordance with some embodiments.

Performance of neural networks for face recognition is correlated with the number of labeled face images available for training. Better performing networks may be produced by accessing billions of such training images. In some cases, images are obtained from photo sharing sites or other social networks that are either hosted by the entity that develops the face recognition network or the images may be available by web scraping, buying a cultivated set of images, or the like.

Large sets of images of real people that are properly labeled (e.g., with images #1, #2, #3 corresponding to person A, images #4, #5 corresponding to person B, etc.) and suitable for training neural networks have many challenges associated with them. First, such a large amount of data is difficult and time-consuming to obtain. Second, the dataset may be very expensive depending on the source and means of obtaining such a large amount of properly labeled images. Third, personal-privacy regulations or commercial agreements may prohibit collection of images or their use for certain purposes. For example, many smaller facial recognition datasets (e.g., 2-10 million images) are publicly available but are restricted for non-commercial use only.

In some examples, high-performing facial recognition networks operate on cropped and aligned face images. A typical processing sequence in such systems is that one or more faces are detected in a still image or a frame from a video sequence. The detected face is then analyzed to find facial landmarks such as the left and right eye, the tip of the nose, and the corners of the lips. Other landmarks or additional landmarks may be detected as well. These landmarks are then used to apply some type of spatial transformation to the face image, which is also cropped and rescaled, such that the resulting cropped and aligned images are all a consistent scale and orientation. These transformed images are then passed into the facial recognition network for either training or during inference.

In an example, synthetic face images may be generated. These may be used to replace or augment the real face images. One technique for generating synthetic face images includes using deep networks arranged as generative adversarial networks (GANs). Such networks may produce a large number of images of synthetic faces, which do not correspond to any real person. These synthetic faces are not real, but appear to feature a real person, and may be indistinguishable from a real person to an average or even expert viewer. Although the quality of faces and the pixel resolution are sufficient in synthetic images for facial recognition, such synthetic generation techniques are limited in the ability to produce multiple different images of the same synthetic person. Certain features of the person (e.g., hair style, presence/absence of facial hair, skin tan) or accessories (e.g., eyeglasses, jewelry) may be added or modified. In some examples, modifications may include differences in age, lighting, background, pose, etc. However, including these changes is computationally expensive and may not capture the range of image-to-image variation seen in images of real people with sufficient accuracy.

In order to solve these technical issues, the systems and methods described herein may be used to generate a preconditioned model using synthetic face images or real face images (or a combination), such as in a limited set of unlabeled images. This technological solution may include further modifying the preconditioned model using a set of real face images, which may be labeled, but include far fewer images than the preconditioning set. The labeled images may be easier to acquire or require less computation. The labeled images may include fewer (e.g., orders of magnitude fewer, such as 10, 100, 1,000, 10,000, etc. fewer) images than the preconditioning set. Training the preconditioned model is an improvement to the technology of generating facial recognition models.

Deep networks may be preconditioned by training some or all of a network on a task that is different from a final goal (e.g., using transfer learning). In so doing, a preconditioned network may be trained on the final task (e.g., face recognition) using a much smaller training set (e.g., using transfer learning) than required when training the same network from scratch.

Some forms of preconditioning a network may use unlabeled training data, which is advantageous since unlabeled images are generally much more readily available than properly labeled images. One method of using unlabeled data includes configuring a network as an autoencoder, such that a first portion of the network decomposes the image into a small number of features. A second portion of the network may transform these features back into an image. Training may include teaching the network to learn how to decompose and reassemble the images such that the result matches (e.g., matches above a threshold) the original image. After completing such training, some or all of the trained autoencoder may be adapted to undergo final training for face recognition. In an example, the architecture of a well-functioning autoencoder network may not be initially optimal for face recognition.

Another form of unsupervised learning is based on the task of identifying matched and non-matched transformations of an image. For example, the training images may be transformed by some combination of random color histogram perturbation, random cropping, random rotations, random scale changes, random affine transformations, applying various convolution operators (e.g., Sobel), etc. In so doing a network may learn essential parts of the randomly transformed images and use them to identify matching and nonmatching pairs. This method of pretraining imposes fewer restrictions on the network architecture and may be more generally applicable than the autoencoding method described above. In this example, the direct application of this method to facial recognition may not be feasible since the number and range of transformations that may be applied to face images that are consistent with the face alignment process discussed above is very limited.

The systems and methods described herein may be used for preconditioning a model, such as for face recognition. The preconditioning may include obtaining a set of facial images, generating, from a plurality of facial images of the set, a plurality of sets of cropped images, each cropped image in the plurality of sets of cropped images including a portion of a face of an image representing a respective set, and preconditioning a machine learning model using the plurality of sets of cropped images. The machine learning model may be refined, such as using a labeled set of captured images of real faces, in an example.

The systems and methods discussed herein may use an unlabeled set of images for preconditioning. The unlabeled set may include images of real faces, images of digitally generated (e.g., synthesized by artificial intelligence) faces, or a combination.

The systems and methods discussed herein solve the technical problem of face recognition at a neural network by using synthetic face images to precondition a facial recognition network. The technological solutions discussed herein provide for preconditioning a facial recognition network using unlabeled face images. In an example, random crops of face images are used to train the network to identify crops that came from the same image and from different images.

In an example, training on unsupervised random crops may use a loss function such as contrastive loss, triplet loss, or the like. The random crops may be implemented in a variety of ways such as fixed size with random position, fixed size with random but non-overlapping position, or variable size which then can be rescaled to a common size. The variable size option may be used to train the network to be able to work at different image scales.

FIG. 1 illustrates a system 100 for preconditioning a model in accordance with some embodiments. The system includes a variety of components, which may be optional in some embodiments. The system 100 includes a computing device 102 (e.g., a computer, such as a desktop or laptop, a server, a mobile phone, etc.) having a processor 104 and memory 106. The computing device 102 may be in communication with a database 108 or a cloud service or server 112. The computing device 102 may include or be communicatively coupled to a display device 110 (e.g., a separate display device or an integrated screen of the computing device 102).

The computing device 102 may be used to perform systems and methods described herein. For example, the computing device 102 may be used to precondition a machine learning model. The preconditioned model may be stored in the database 108, in an example. The computing device 102 or another computing device (e.g., in the cloud 112 or another computer, server, mobile device, etc.) may be used to refine the preconditioned model. For example, the preconditioned model may be retrieved from the database 108 and further refined (e.g., at a later time or date, by a different entity, or the like).

The database 108 may include more than one database, which may be located in different places or across different devices, in some examples. The database 108 may store images to be used for preconditioning or refining a model, in an example. For example the database 108 may store images of synthetic faces, images of real faces, cropped images of faces, or the like.

The database 108 may store a preconditioned model or a set of preconditioned models. In some examples, a refined model or refined models (e.g., different version of a model such as a further refined model, models with different uses such as high security authentication or lighter security, etc.) may be stored in the database 108. Different models may have different attributes (e.g., a model may be larger or more computationally complex requiring more resources). In an example, preconditioned models having different accuracy levels (e.g., based on the amount of preconditioning) may be stored, such as for various uses requiring more or less refining. Different accuracy levels of refined models may also or alternatively be stored, in some examples.

Figure 2:
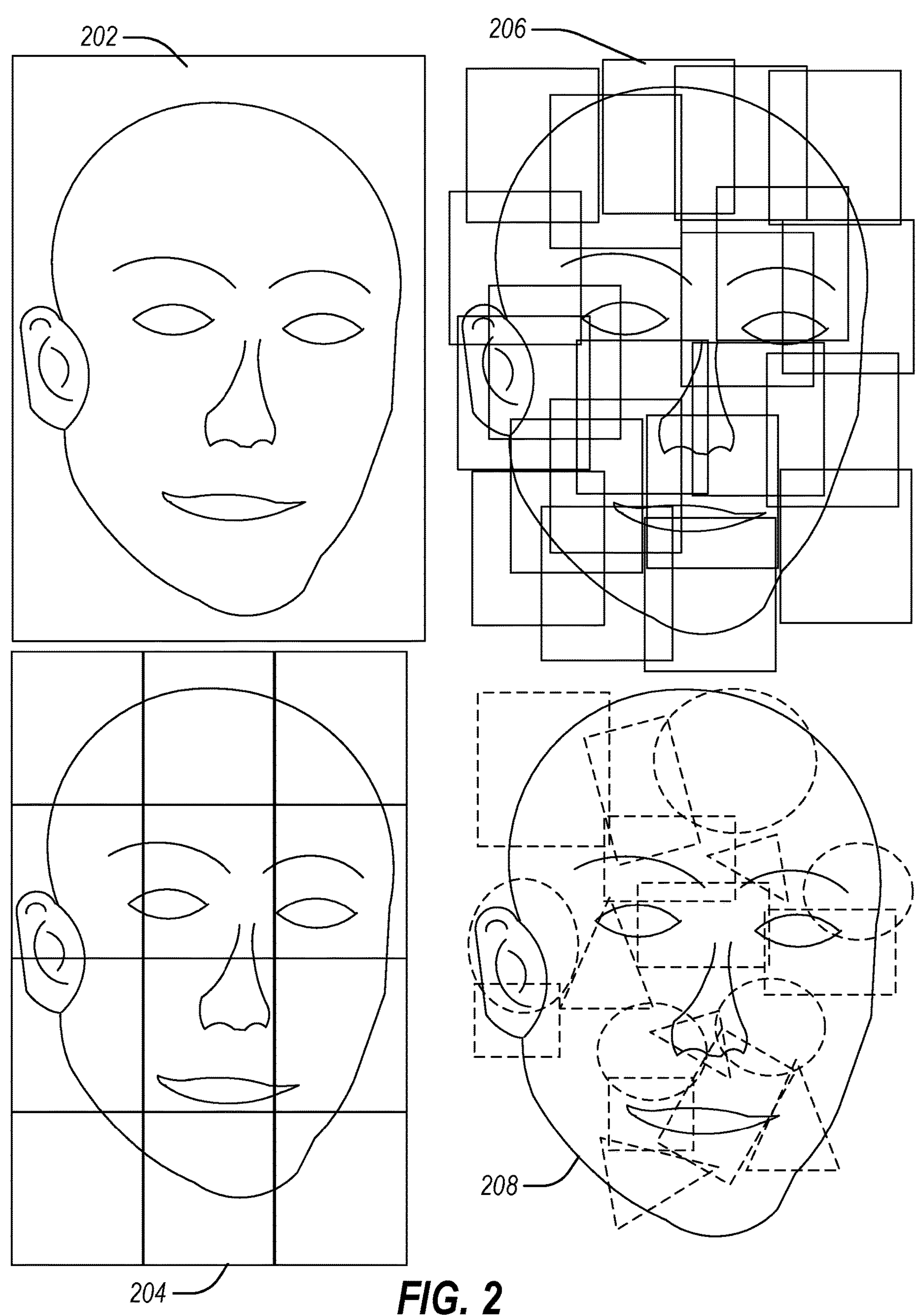
FIG. 2 illustrates images of a face in accordance with some embodiments.

FIG. 2 illustrates images 202, 204, 206, and 208 of a face in accordance with some embodiments. The various face images include example sampling that may occur in training a machine learning model (e.g., for generating a preconditioned model). The image 202 includes a face without partition or cropping. The image 204 includes structured cropping, including a set of uniform crops that do not overlap. The image 204 shows rectangular crops, but other crops may be used (e.g., square, triangle, hexagonal, etc.). In the image 204, the crops are structured to cover the entirety of the image 204, but some crops may be omitted when training a model, for example when they do not include any or a sufficient portion of a face.

The image 206 illustrates random cropping, with overlapping crop portions that are random or arbitrarily chosen. While the example shown in image 206 includes random or arbitrarily chosen crop portions, another example may include overlapping crop portions that are uniform (e.g., an ordered set of overlapping crop portions). In an example, an image may be cropped in different areas of the image according to different cropping rules. For example, a central third of an image (e.g., of a top third, a central third, and a bottom third) may include more crop portions, with overlapping portions, while a top third and a bottom third may include only non-overlapping portions.

The image 208 includes random or arbitrarily chosen crop portions that overlap, do not cover the entirety of the face in the image 208, and include different shapes for crop portions. Any combination or sub-combination of these options or options from images 202, 204, or 206 may be used or combined for use in generating a set of images for training a model.

The face images used for preconditioning may include images of real faces or may include images of synthetically generated faces, such as from a generative adversarial network (GAN) or other such technique. Combinations of real and synthetic faces may be used for precondition training, in some examples.

In an example, the type of cropping may change during course of the precondition training. For example, early in training the crops may be of fixed size but in completely random position. In so doing, a portion of the images cropped from the same face image may overlap allowing the network to identify matching regions and better discern crops from the same image from those from different images. As the network learns, the allowable degree of overlap of the random crops may be reduced. In an example, at some point in the training only non-overlapping crops may be allowed (e.g., after a particular number of images have been processed, after a particular amount of time has passed, etc.). This procedure may allow such a network to be trained more quickly than one that is only trained on non-overlapping crops from the start.

In some examples, crops used for training may be non-random. For example, crops may be taken of the four quadrants of the face image, which may overlap if oversized or not overlap if they are exactly quarter images or smaller. In some cases, the center portion of the image may be included as an (overlapping) crop.

In an example, cropping may be combined with randomization of color histograms in an image, for example to limit the ability of the network to learn to match color histograms in order to accomplish the preconditioning task. When the color histograms are randomized, the network is forced to learn ways to relate structural features of the face image, rather than based on color, which may be less useful. Instead of or in conjunction with color histogram randomization, some or all of the images may be converted to gray scale. In these and other examples, random changes to contrast and intensity may be used to limit the ability of the network to match based on color or gray-scale color related aspects.

Figure 3:
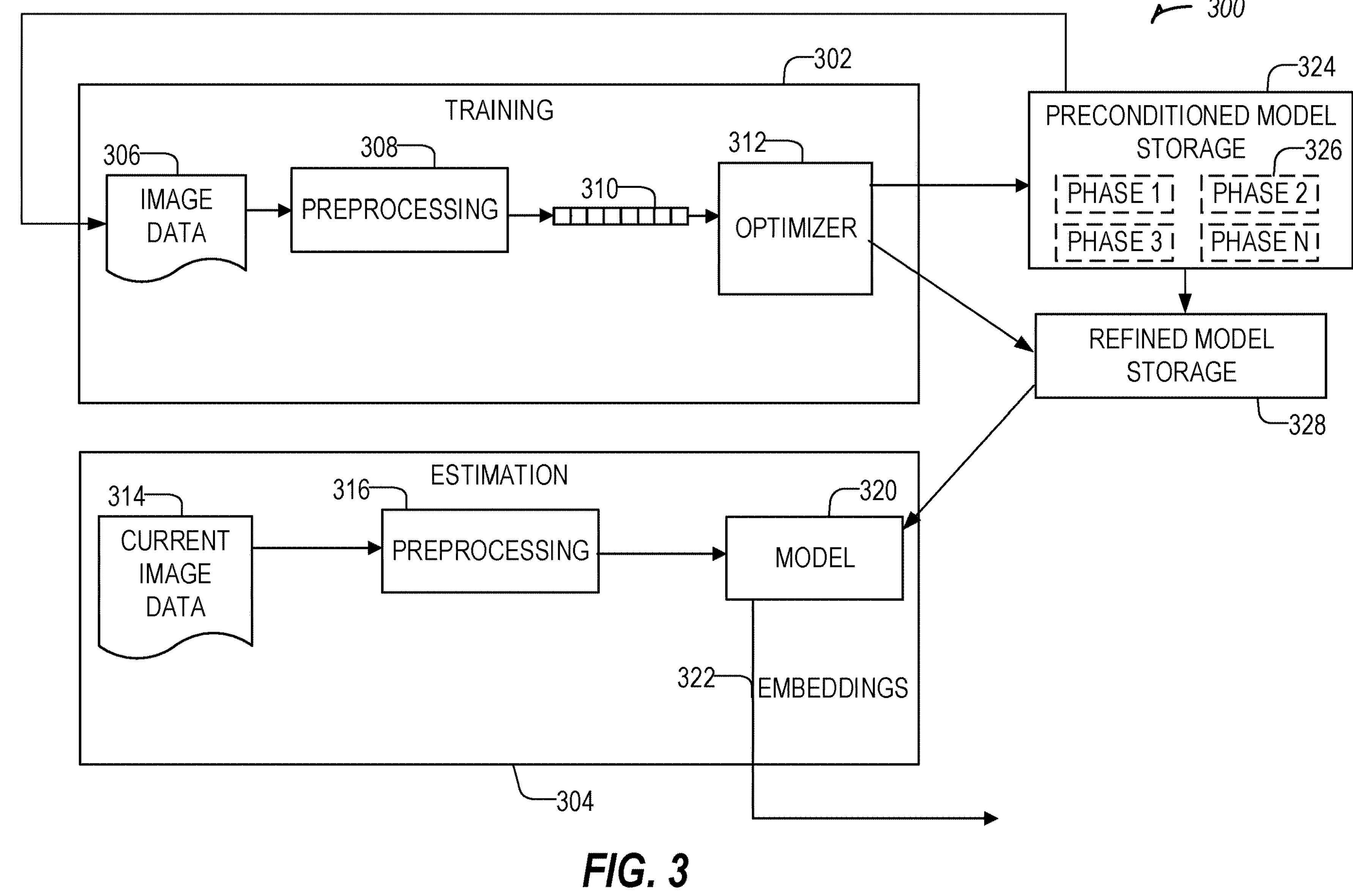
FIG. 3 illustrates an example machine learning training and implementation system in accordance with some embodiments.

FIG. 3 illustrates an example machine learning training and implementation system in accordance with some embodiments. FIG. 3 shows an example machine learning engine 300 according to some examples of the present disclosure. Machine learning engine 300 may be part of the system 100 of FIG. 1, for example implemented using the database 108, a server or device in the cloud 112, etc.

Machine learning engine 300 utilizes a training engine 302 and a prediction engine 304. Training engine 302 inputs image data 306, such as unlabeled images, labeled images, cropped images, etc. into preprocessing block 308, for example. The image data 306 may include synthesized data (e.g., faces that appear real but that are digitally generated and do not correspond to a real person), images of real faces, such as captured by a camera, or a combination. The image data 306 may be labeled with an identity or identifier of a real or synthesized person or may be unlabeled (e.g., not include any identifier or identity).

Preprocessing block 308 may be used to edit the input image data 306, such as to rotate, crop, or filter the image data 306. The preprocessed input is then sent to a machine learning algorithm 310, which outputs a feature. The feature may be sent to the optimizer 312 for optimizing features or embeddings. The optimizer 312 is used for optimization of features or embeddings (e.g., features may be used to evaluate whether images include faces that do or do not come from the same face). A model may be output that is trained to recognize a face.

In the prediction engine 304 (also called estimation), current image data 314 (e.g., an image with a face, a cropped face, or more than one face) may be input to preprocessing block 316. The preprocessing block 316 may perform operations the same or similar to preprocessing block 308 of the training engine 302. In some examples, prediction block 316 and 308 are the same engine. The preprocessing block 316 may produce a feature vector or modified image data, which is input into the model 320 to generate one or more embeddings 322. The output embeddings may be compared to labels to evaluate whether a face in the current image data 314 may be identified. An output from the prediction engine 304 may include an indication that the image does not include a face or does not include a known face, may include an identity of the face in the current image data 314, may output a matching face, or the like.

The training engine 302 may operate in an offline manner to train the model 320, in one example, or in an online manner in another example. When training online, the model may be preconditioned, as described herein. The preconditioning may be performed offline. The prediction engine 304, may be designed to operate in an online or offline manner.

The model 320 may be updated via additional training or feedback. For example, the model 320 may be a preconditioned model for later refinement. A preconditioned model 326 may be stored in a preconditioned model storage medium 324. The preconditioned model 326 may have various attributes, such as a particular completion condition (e.g., an amount of time or processing power needed, a number of images needed, etc.), accuracy, likely accuracy (e.g., predicted accuracy based on available image data for refinement), amount of further refinement needed, etc. In some examples, the preconditioned model 326 may be a first or subsequent refinement of an earlier preconditioned model. For example, preconditioned model 326 may be at a refinement stage of using only non-overlapping cropped portions of input images (e.g., after a stage using overlapping), while an earlier preconditioned models saved in the storage medium 324 may include training using overlapping cropped portions. In some cases, the preconditioned model 326 may be saved as a refined model. The preconditioned model 326 may be fed back through the training engine 302 or a different training engine (e.g., having different image data 306 input to the preprocessing block 308) to refine the preconditioned model 326. In an example, the preconditioned model 326 may be refined using a different training engine, or a modified version of the training engine 302, such as using fewer layers, or determining whether images come from a same face.

In an example, the model 320 may be a refined model. A refined model may include a model that was preconditioned using a first technique (e.g., with cropped portions of images, synthetic images, or the like), and then refined, optionally using a second technique (e.g., with real faces, with no cropping, or the like). A refined model may be stored in a refined model storage medium 328. This storage medium 328 may by in a single storage location or device with the storage medium 324, or may be separately stored. The storage medium 328 may be accessed by an end user for use with the prediction engine 304, for example to generate matches of facial images. In some examples, access may be restricted to end users to the storage medium 324 (e.g., limited to those users who are refining a preconditioned model, which may be a different set of users than those that are using or deploying a refined model).

When refining the preconditioned model 326, the training engine 302 (or a different training engine) may use a set of real face images, such as a thousand, ten thousand, one hundred thousand, millions, etc. of face images, for example across tens, hundreds, thousands, or millions of different identities. The refining of the preconditioned model 326 may be done at a later time, such as for a particular purpose (e.g., using a specified set of real faces), in real-time, in an online mode (whereas the preconditioning may be done offline), or the like.

The machine learning algorithm 310 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 302. In an example embodiment, a regression model is used and the model 320 is a vector of coefficients corresponding to a learned importance for each of the features in a feature.

Once trained, the model 320 may output face recognition information. This information may include an identity or identifier of a person or face match as determined by the model 320 based on an input image of a face or cropped face or multiple faces. This information may include an indication that no match was found by the model 320. In some examples, a percentage of match likelihood or confidence interval may be included with an identified match. In an example, the output may include an indication that the input includes a fake or synthesized face (e.g., not an image including a real person's face) or may indicate that the input includes a real face. Either indication of fake or real face may include a confidence interval for the indication.

When a model is preconditioned to associate random crops of a face, the subsequent face recognition network (e.g., a refined model based on the preconditioned model) may operate on cropped images (e.g., receive a cropped image as an input, and identify a face corresponding to the cropped image). In an example, random crops are taken from labeled face images. The network operates on each cropped image to form an embedding of some specific size (e.g., 128 dimensions) which may then be used in a training framework such as ArcFace, SphereFace, or other training framework. The network may learn to associate different crops from different images of the same person with similar embeddings, and associate different crops from images of different people to embeddings that are spaced far apart.

During inference, one or more embeddings may be generated from crops of a face image. In an example, a number of cropped images may be generated from a single face image and used to generate a corresponding number of embeddings. The single face image may be a synthetic image, in an example. These embeddings may be combined, such as by averaging them together to produce a single composite embedding for the face image. The cropped images may be generated randomly or may be at fixed positions in a uniform grid or some other prespecified pattern. Cropped images may be generated from multiple images, such as a sequence of frames in a video. Embeddings may be combined by averaging across spatial dimensions or across image frames.

When one or more embeddings are generated per detected face, they may be compared to other such embeddings to determine a match using a variety of techniques. For example, two embeddings may be compared by finding the cosine of the angle between the L2-normalized embeddings. When the cosine is larger than a certain threshold, a match determination may be made, and when below a certain threshold, a non-match determination may be made. In another example, the embeddings may be treated as points in a multidimensional space and matching is performed using the distance between two such points. Points that are closer than a certain threshold distance may be indicated as matching and those above the threshold may be indicated as not matching. Distances between the points may be measured in multiple ways including Euclidean distances (e.g., a chord) or Non-Euclidean (e.g., a geodesic).

In another example, instead of or in addition to combining embeddings as discussed above, the embeddings generated from multiple crops (e.g., within an image or across image frames) may be used individually to match against some prestored embedding. The results of these multiple matches may then be combined, such as by a voting scheme.

When the network has learned to operate on cropped images of the face, the need to perform a face alignment step may be reduced. In some examples, face alignment may be omitted for training or inference. The need to rescale the face image to a common size may be reduced, in some examples. In one example, face rescaling may be omitted for training or inference.

Figure 4:
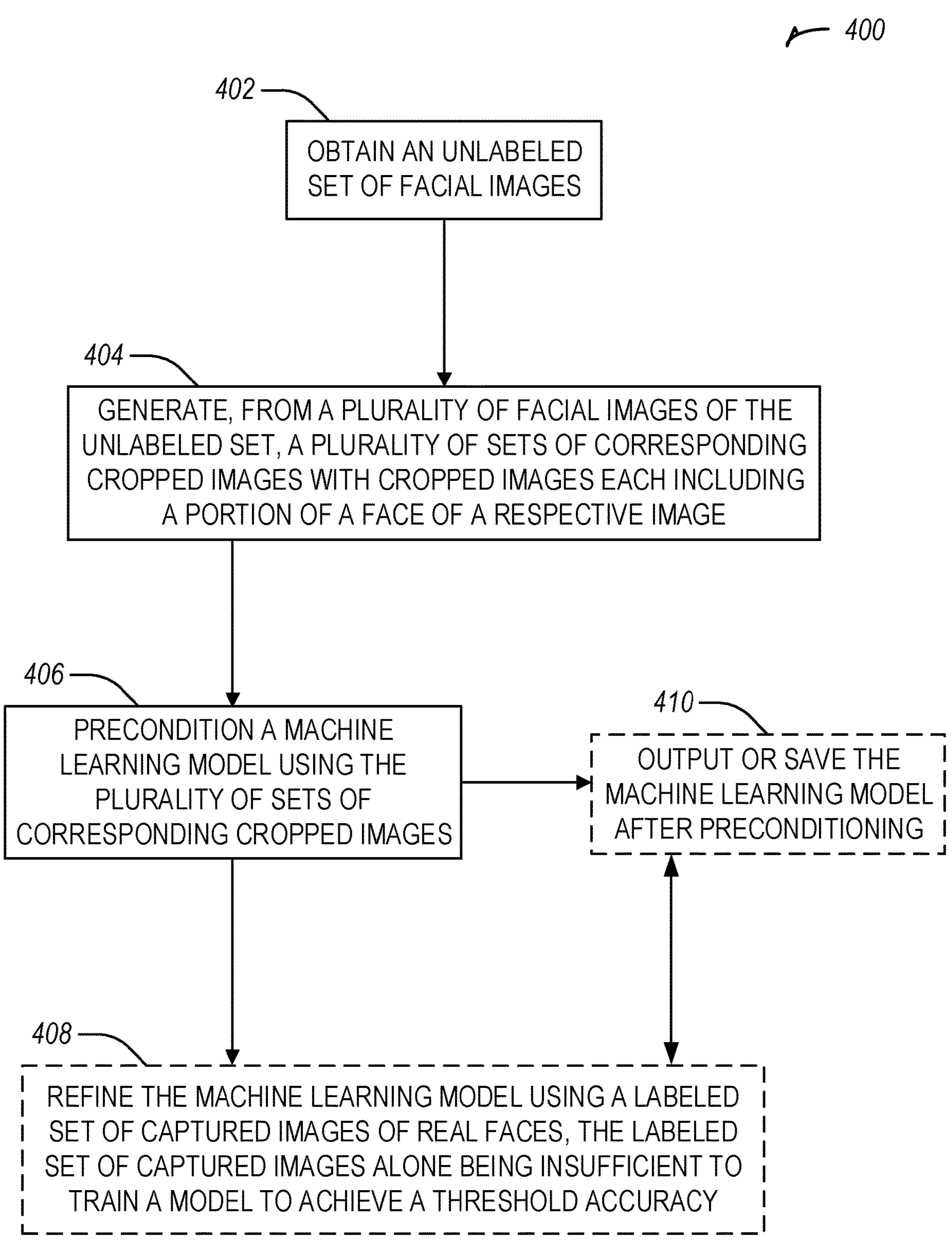
FIG. 4 illustrates a flowchart showing a technique for preconditioning a model in accordance with some embodiments.

FIG. 4 illustrates a flowchart showing a technique 400 for preconditioning a model in accordance with some embodiments. In an example, operations of the technique 400 may be performed by processing circuitry, for example by executing instructions stored in memory. The processing circuitry may include a processor, a system on a chip, or other circuitry (e.g., wiring). For example, technique 400 may be performed by processing circuitry of a device (or one or more hardware or software components thereof), such as those illustrated and described with reference to FIG. 1.

The technique 400 includes an operation 402 to obtain an unlabeled set of facial images. The set of facial images may be digitally generated (e.g., synthesized), such as using a machine learning technique, as described herein. The digitally generated images may be ones that are not depictive of any real faces. For example, the images may appear to be real faces, but do not intentionally correspond to any actual person, living or dead.

The technique 400 includes an operation 404 to generate, from a plurality of facial images of the unlabeled set, a plurality of sets of cropped images, each cropped image in the plurality of sets of cropped images including a portion of a face of an image representing a respective set. The portion of the face may include less than the entirety of face, in an example. In some examples, a cropped image may include a background portion, a portion overlapping another cropped image, a random portion of the image, an ordered portion of the image (e.g., four, eight, 100, etc. boxes per image), or the like. The cropped images may be labeled as belonging to respective digitally generated identifiers or identities (e.g., each facial image, though unlabeled, may have an associated identifier, and the identifier may be used for each cropped image from a corresponding facial image). In an example, operation 404 includes randomly cropping each of the unlabeled set a specified number of times to generate the cropped images. In an example, the plurality of sets may include images with overlapping cropping.

The technique 400 includes an operation 406 to precondition a machine learning model using the plurality of sets of cropped images. Operation 406 may include executing a first preconditioning that uses the images with overlapping cropping and a second preconditioning that uses only images from the plurality of sets of cropped images that do not include overlapping cropping. The first and second preconditioning steps may be done sequentially, or they may overlap by gradually phasing out overlapping cropping. The first and second preconditioning steps may include entirely different sets of cropped images, or may include some same cropped images. In an example, preconditioning includes gradually stepping from completely random cropping to ordered cropping that excludes overlapped cropping.

After preconditioning the model, the technique 400 may continue with either of operations 408 or 410, or with both operations. When continuing with operation 410, the technique 400 may include later accessing the saved or output model for further refining. The technique 400 includes an optional operation 408 to refine the machine learning model using a labeled set of captured images of real faces, the labeled set of captured images alone being insufficient to train a model to achieve a threshold accuracy. The machine learning model may be trained to output an identifier from an input image, which may be a full face image or a cropped face image. The technique 400 includes an optional operation 410 to output or save the machine learning model after preconditioning.

Figure 5:
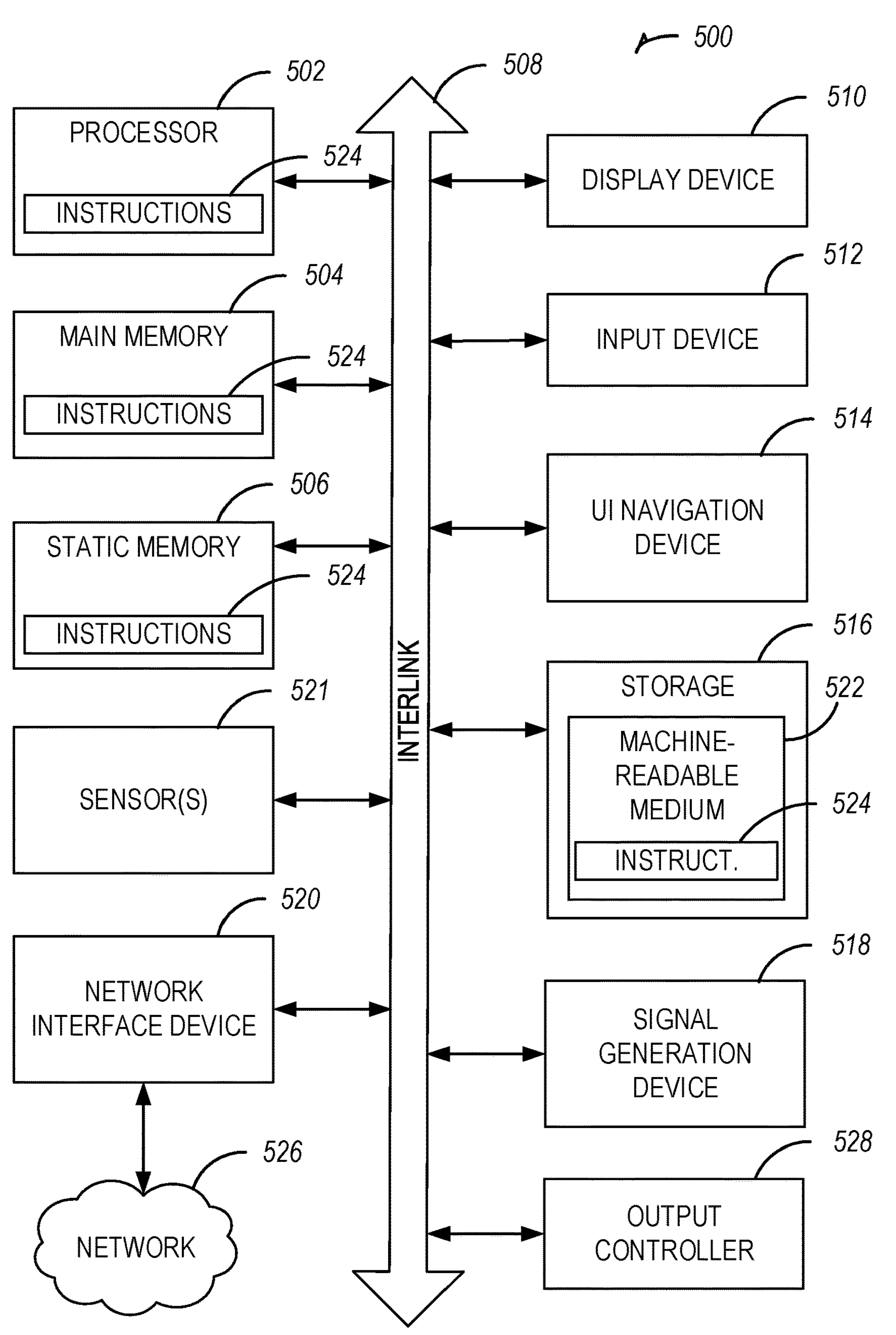
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments, such as computing device 102 or a device operating in the cloud 112. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a system for comprising: a processor; memory, including instructions, which when executed by the processor, cause the processor to: obtain an unlabeled set of digitally generated facial images; generate, from a plurality of facial images of the unlabeled set, a plurality of sets of cropped images, each cropped image in the plurality of sets of cropped images including a portion of a face of an image representing a respective set; precondition a machine learning model using the plurality of sets of cropped images; and refine the machine learning model using a labeled set of captured images of real faces, the labeled set of captured images alone being insufficient to train a model to achieve a threshold accuracy.

In Example 2, the subject matter of Example 1 includes, wherein the portion of the face is less than an entirety of the face.

In Example 3, the subject matter of Examples 1-2 includes, wherein the digitally generated facial images are synthetic and are not depictive of real faces.

In Example 4, the subject matter of Examples 1-3 includes, wherein the cropped images are labeled as belonging to respective digitally generated identities.

In Example 5, the subject matter of Examples 1-4 includes, wherein to generate the plurality of sets of cropped images, the instructions are further to cause the processor to randomly crop each of the unlabeled set a specified number of times.

In Example 6, the subject matter of Examples 1-5 includes, wherein the plurality of sets of cropped images include images with overlapping cropping.

In Example 7, the subject matter of Examples 1-6 includes, wherein to precondition the machine learning model, the instructions are further to cause the processor to execute a first preconditioning that uses the images with overlapping cropping and a second preconditioning that uses only images from the plurality of sets of cropped images that do not include overlapping cropping.

In Example 8, the subject matter of Examples 1-7 includes, wherein the machine learning model is trained to output an identifier from an input cropped image.

Example 9 is a method for comprising: obtaining an unlabeled set of digitally generated facial images; using a processor, generating, from a plurality of facial images of the unlabeled set, a plurality of sets of cropped images, each cropped image in the plurality of sets of cropped images including a portion of a face of an image representing a respective set; preconditioning, using the processor, a machine learning model using the plurality of sets of cropped images; and refining the machine learning model using a labeled set of captured images of real faces, the labeled set of captured images alone being insufficient to train a model to achieve a threshold accuracy.

In Example 10, the subject matter of Example 9 includes, wherein the portion of the face is less than an entirety of the face.

In Example 11, the subject matter of Examples 9-10 includes, wherein the digitally generated facial images are synthetic and are not depictive of real faces.

In Example 12, the subject matter of Examples 9-11 includes, wherein the cropped images are labeled as belonging to respective digitally generated identities.

Example 13 is at least one machine-readable medium, including instructions, which when executed, cause a processor to perform operations comprising: obtaining an unlabeled set of digitally generated facial images; using a processor, generating, from a plurality of facial images of the unlabeled set, a plurality of sets of cropped images, each cropped image in the plurality of sets of cropped images including a portion of a face of an image representing a respective set; preconditioning, using the processor, a machine learning model using the plurality of sets of cropped images; and refining the machine learning model using a labeled set of captured images of real faces, the labeled set of captured images alone being insufficient to train a model to achieve a threshold accuracy.

In Example 14, the subject matter of Example 13 includes, wherein the portion of the face is less than an entirety of the face.

In Example 15, the subject matter of Examples 13-14 includes, wherein the digitally generated facial images are synthetic and are not depictive of real faces.

In Example 16, the subject matter of Examples 13-15 includes, wherein the cropped images are labeled as belonging to respective digitally generated identities.

In Example 17, the subject matter of Examples 13-16 includes, wherein generating the plurality of sets of cropped images includes randomly cropping each of the unlabeled set a specified number of times.

In Example 18, the subject matter of Examples 13-17 includes, wherein the plurality of sets of cropped images include images with overlapping cropping.

In Example 19, the subject matter of Examples 13-18 includes, wherein preconditioning the machine learning model includes a first preconditioning that uses the images with overlapping cropping and a second preconditioning that uses only images from the plurality of sets of cropped images that do not include overlapping cropping.

In Example 20, the subject matter of Examples 13-19 includes, wherein the machine learning model is trained to output an identifier from an input cropped image.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A system for comprising:

a processor;

memory, including instructions, which when executed by the processor, cause the processor to:

obtain an unlabeled set of digitally generated facial images;

generate, from a plurality of facial images of the unlabeled set, a plurality of sets of cropped images, each cropped image in the plurality of sets of cropped images including a portion of a face of an image representing a respective set;

precondition a machine learning model using the plurality of sets of cropped images, wherein preconditioning the machine learning model includes a first preconditioning that uses images from the plurality of sets of cropped images with overlapping cropping and a second preconditioning that uses only images from the plurality of sets of cropped images that do not include overlapping cropping; and refine the machine learning model, via transfer learning, using a labeled set of captured images of real faces, the labeled set of captured images alone being insufficient to train a model to achieve a threshold accuracy.

2. The system of claim 1, wherein the portion of the face is less than an entirety of the face.

3. The system of claim 1, wherein the digitally generated facial images are synthetic and are not depictive of real faces.

4. The system of claim 1, wherein the cropped images are labeled as belonging to respective digitally generated identities.

5. The system of claim 1, wherein to generate the plurality of sets of cropped images, the instructions are further to cause the processor to randomly crop each of the unlabeled set a specified number of times.

6. The system of claim 1, wherein the machine learning model is trained to output an identifier from an input cropped image.

7. A method for comprising:

obtaining an unlabeled set of digitally generated facial images;

using a processor, generating, from a plurality of facial images of the unlabeled set, a plurality of sets of cropped images, each cropped image in the plurality of sets of cropped images including a portion of a face of an image representing a respective set;

preconditioning, using the processor, a machine learning model using the plurality of sets of cropped images, wherein preconditioning the machine learning model includes a first preconditioning that uses images from the plurality of sets of cropped images with overlapping cropping and a second preconditioning that uses only images from the plurality of sets of cropped images that do not include overlapping cropping; and refining the machine learning model, via transfer learning, using a labeled set of captured images of real faces, the labeled set of captured images alone being insufficient to train a model to achieve a threshold accuracy.

8. The method of claim 7, wherein the portion of the face is less than an entirety of the face.

9. The method of claim 7, wherein the digitally generated facial images are synthetic and are not depictive of real faces.

10. The method of claim 7, wherein the cropped images are labeled as belonging to respective digitally generated identities.

11. At least one machine-readable medium, including instructions, which when executed, cause a processor to perform operations comprising:

obtaining an unlabeled set of digitally generated facial images;

using a processor, generating, from a plurality of facial images of the unlabeled set, a plurality of sets of cropped images, each cropped image in the plurality of sets of cropped images including a portion of a face of an image representing a respective set;

preconditioning, using the processor, a machine learning model using the plurality of sets of cropped images, wherein preconditioning the machine learning model includes a first preconditioning that uses images from the plurality of sets of cropped images with overlapping cropping and a second preconditioning that uses only images from the plurality of sets of cropped images that do not include overlapping cropping; and refining the machine learning model, via transfer learning, using a labeled set of captured images of real faces, the labeled set of captured images alone being insufficient to train a model to achieve a threshold accuracy.

12. The at least one machine-readable medium of claim 11, wherein the portion of the face is less than an entirety of the face.

13. The at least one machine-readable medium of claim 11, wherein the digitally generated facial images are synthetic and are not depictive of real faces.

14. The at least one machine-readable medium of claim 11, wherein the cropped images are labeled as belonging to respective digitally generated identities.

15. The at least one machine-readable medium of claim 11, wherein generating the plurality of sets of cropped images includes randomly cropping each of the unlabeled set a specified number of times.

16. The at least one machine-readable medium of claim 11, wherein the machine learning model is trained to output an identifier from an input cropped image.

* * * * *